United States Patent [19]

Marshall et al.

[11] Patent Number: 4,888,800
[45] Date of Patent: Dec. 19, 1989

[54] SECURE MESSAGING SYSTEMS

[75] Inventors: Alan D. Marshall, Merchants Landing; Christopher J. Mitchell, Codford; Graeme J. Proudler, Meade Park, all of England

[73] Assignee: Hewlett-Packard Company, Palo Alto, Calif.

[21] Appl. No.: 162,706

[22] Filed: Mar. 1, 1988

[30] Foreign Application Priority Data

Mar. 3, 1987 [GB] United Kingdom ............... 8704920

[51] Int. Cl.$^4$ ............................................. H04L 9/04
[52] U.S. Cl. ........................................ 380/21; 380/25
[58] Field of Search ............................. 380/21, 25, 49

[56] References Cited

U.S. PATENT DOCUMENTS

| | | | |
|---|---|---|---|
| 4,182,933 | 1/1980 | Rosenblum | 380/21 |
| 4,193,131 | 3/1980 | Lennon et al. | 380/25 |
| 4,203,166 | 5/1980 | Ehrsam et al. | 380/49 |
| 4,386,233 | 5/1983 | Smid et al. | 380/21 |
| 4,500,750 | 2/1985 | Elander et al. | 380/25 |
| 4,578,531 | 3/1986 | Everhart et al. | 380/21 |
| 4,649,233 | 3/1987 | Bass et al. | 380/21 |
| 4,691,355 | 9/1987 | Wirstrom et al. | 380/25 |
| 4,771,461 | 9/1988 | Matyas | 380/25 |
| 4,794,644 | 12/1988 | Philip et al. | 380/25 |
| 4,850,017 | 7/1989 | Matyas, Jr. et al. | 380/21 |

OTHER PUBLICATIONS

*Security for Computer Networks*, Davies and Price, pp. 157–159.

Primary Examiner—Salvatore Cangialosi

[57] ABSTRACT

A secure communication system wherein encrypted messages are passed between selected pairs of user terminals in a secure messaging system. A link is first established between the two terminals of the pair, one terminal sending a request to a key distribution center (KDC), which then provides encrypting keys to both terminals so they can communicate with each other. (Messages involving the KDC are themselves protected by encryption). The keys sent out by the KDC are key transporting keys, which are used by the terminals solely to transport data transporting keys between each other. The data transporting keys are used to transport (encrypt) the actual messages, and for security are changed after a usage count is reached; a fresh data transporting key is then generated and transferred under the key transporting key. This minimizes the load on the KDC. A hierarchy or key transporting keys can be used. The KDC (but not the user terminals) maintains a log to enable recover after a system failure. A journey key can be generated to allow a user temporary access to a link from a third terminal.

10 Claims, 5 Drawing Sheets

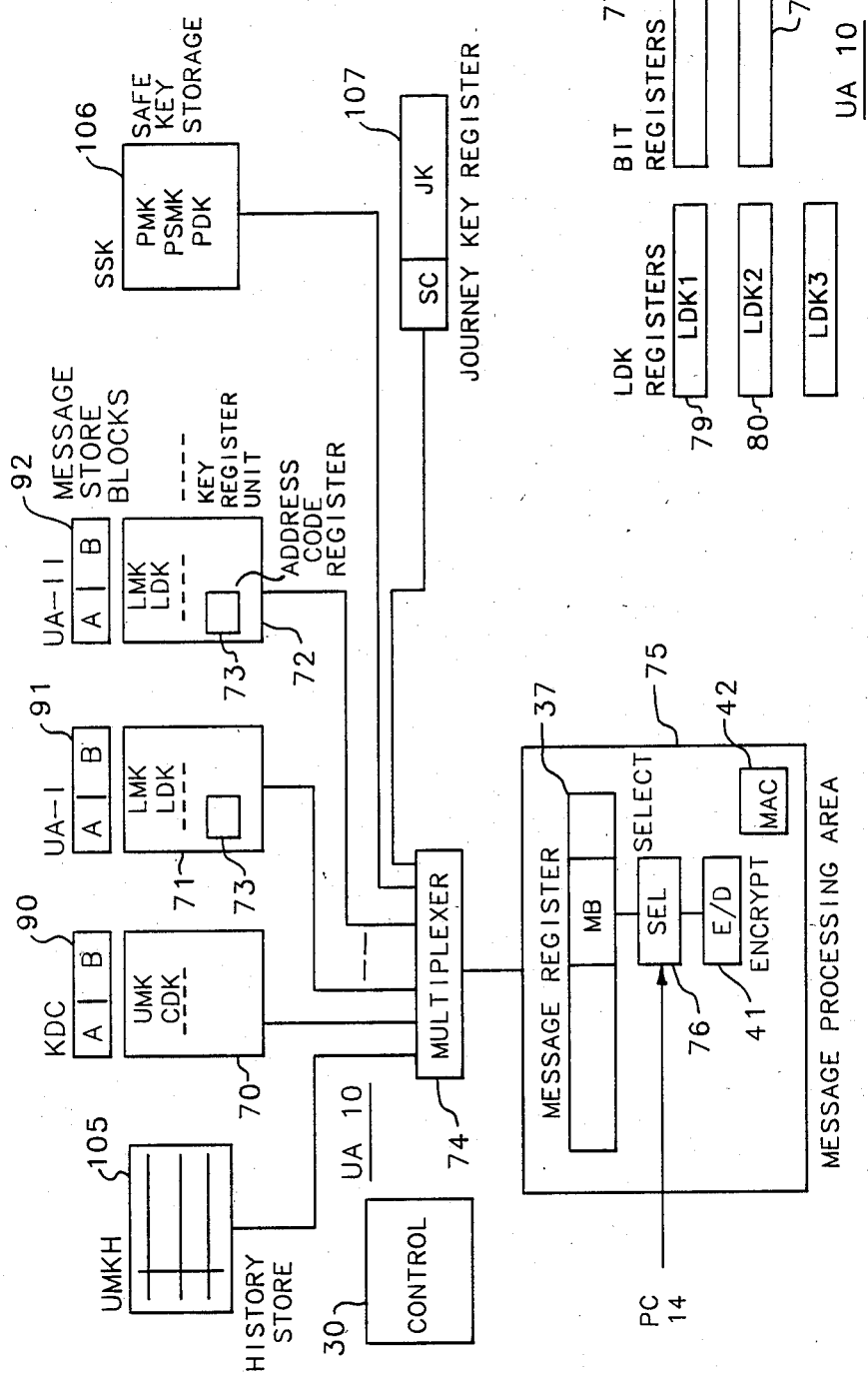

SECURE MESSAGING SYSTEMS

The present invention relates to secure messaging systems.

Communication networks in which a considerable number of terminals such as personal computers are interconnected are well known. Such systems often use communications media which are not secure, such as public telephone systems, in that they are liable to passive interference (eavesdropping) and active interference (interception and removal of messages, modification of messages, and insertion of false messages). To overcome these problems, it is known to provide encryption systems. However, while the principle of encryption is obvious, there are considerable practical problems involved in designing a system which includes a substantial number of terminals.

SUMMARY OF THE INVENTION

The present invention is concerned more specifically with key management. In a system with several terminals, there is a basic choice to be made between providing more or less permanent connections between all terminals and providing connections between only those terminals which require connection. In the former case, control may be distributed or located in a special control terminal, a key distribution center. In the latter, control must be located in a key distribution center, so that two terminals which are not connected may have a secure intermediary through which they can achieve a connection.

Such a key distribution center (KDC) system is known, in which, whenever a terminal (the first terminal) wants to communicate securely with another terminal (the second terminal), the first terminal requests KDC to set up a link with the second terminal. Communications between the two terminals and the KDC are themselves secure under the protection of encryption under keys shared by a terminal and the KDC; such keys may be termed control data keys, since they are concerned with the control function of communication between the terminals and the KDC, and with transferring information ("data") from the KDC to the terminals; the "data" is keys for use by the terminals in communicating with each other. In this known system, a terminal asks the KDC for keys called session keys setting up a link with another terminal each time it wants to communicate with the other terminal.

This system has the advantage that each terminal has only to maintain the keys required for whatever current communication sessions it is having with other terminals. The KDC has to provide the two terminals of a link with a pair of session keys (one for each direction) every time a link or session is requested; the two terminals then carry out whatever communications they require with each other in the session without further intervention of the KDC.

According to the present invention there is provided a secure communication system comprising at least 3 terminals and a key distribution center (KDC), in which the KDC on request by a first terminal provides the first terminal and a second terminal specified by the first terminal with key means, under encryption by key transporting keys each of which is shared by a single terminal and the KDC, for communication between the pair of terminals, characterized in that the key means so provided are used as key transporting keys by the two terminals to exchange data transporting keys which are in turn used by the two terminals for passing data between them.

Preferably the key means consist of two keys, one for encrypting messages from the first terminal to the second and the other for encrypting messages from the second terminal to the first.

The result of this is that the link between the two terminals is substantially permanent. Once it has been set up, the KDC only has to update the key means which is only required infrequently. The keys used to transport data (user messages) between the two links have associated with them usage counters, and each terminal includes means for updating those keys on their usage reaching a predetermined value; the new keys are then transported between the two terminals by means of the key transporting keys. (The data transporting keys may be updated at different times for the two directions along the link, depending on the relative numbers of messages in two directions.) The workload on the KDC is thus substantially reduced.

It will of course be realized that there may be a hierarchy of key transporting keys, with the keys higher in the hierarchy being used to transport keys lower in the hierarchy and the keys lowest in the hierarchy being used to transport the data keys. Thus the top keys in the hierarchy transport the data keys, but indirectly, via the use of the lower keys in the hierarchy.

Preferably the system also provides for messages from either of the two terminals to the KDC to terminate the link, with the terminal sending that message erasing from itself the keys relating to that link and the KDC sending a message to the other terminal to cause it also to erase from itself the keys relating to that link.

The invention also preferably provides, in each terminal, usage counting means for counting the usage of each data transporting key, means for updating such a key on its usage reaching a predetermined value, and means for causing the updated key to be transported to the terminal at the other end of its associated link. The same technique is preferably also used for the key transporting keys if a hierarchy of such keys is used.

The invention also preferably provides means enabling a link to be terminated by a terminal, comprising, in each terminal, means for erasing the keys therein associated with the link, a request at a terminal to terminate a link operating the erasure means in that terminal and sending a link termination message to the KDC, the KDC including means for logging the message and sending a link termination message to the other terminal of the link to operate the erasure means in that other terminal.

It may happen that a user wants to change temporarily from one UA to another. He will then want to be able to use the new UA temporarily to read messages which have been directed to his normal UA.

Accordingly the invention preferably also permits the user to request, from his terminal (UA1), the KDC for a journey key, specifying which other terminal (UA2) he wants to use. The KDC thereupon issues him with a journey key, and also sets up the UA which he is visiting to respond to the journey key, sending the journey key (under encryption) to UA2, where it is stored in a journey key register together with the address code of UA1. The user also sets up his own UA (UA1) to store all received messages and to respond to calls from UA2 by sending them to UA2, encrypted under the journey key. At UA2, user uses his journey key to decrypt his messages.

In any system, failures sometimes occur. In the present system, no provision is made for recovery from failure at a UA, since that would involve the provision of back-up facilities for the encryption and encryption keys there, so damaging the security of the system. However, provision is made for recovery from failure at the KDC, which is in a more secure environment and which can more readily accommodate security measures to minimize the risk to security of having such back-up provisions.

According to the invention, the KDC preferably maintains a record or log of all messages received and sent by it, in the order in which they are acted upon, and the state of the KDC is periodically stored as a back-up. If there is a failure at the KDC, it is first backed up to the previously stored state, the log of all messages which have occurred since then is played back to the KDC, and any messages which involved the generation and sending out of keys are repeated, so sending out fresh keys to the UA's to replace those which were previously sent out but have become lost by the KDC.

This brings the KDC up to its correct current state, and the system as a whole to a consistent state. The replay of the stored messages by itself does not restore the system fully, because those keys which were generated after system back-up state was stored have been lost. Hence during the play-back of the log, any messages which involved the generation and sending out of keys are repeated, so sending out fresh keys to the UA's to replace those which were previously sent out but have become lost by the KDC. The change of keys may result in some messages being lost, but that can be dealt with by the provisions for dealing with lost messages.

Various of the above-mentioned and further features and advantages will be apparent from the specific examples described hereinbelow of an exemplary apparatus.

BRIEF DESCRIPTION OF THE DRAWING

FIG. 4 is a more general block diagram of a UA terminal.

FIG. 4A is a detailed block diagram of a part of the KDC.

DETAILED DESCRIPTION

The description is divided into the following sections:
General system arrangement —FIG. 1
General system operation —key hierarchy
Message structure and UA structure
UA to KDC linkage
Communication between UA's
System message error recovery
Local message storage
Change of UA
KDC message logging In this specification, the words "packet" and "bundle" are used interchangeably to refer to a plurality of separately-generated messages, each of which stands alone as a complete message, all but one of which have previously been transmitted from a first terminal to a second terminal but acknowledgment of which has not been received by the first terminal, and all of which are concatenated for transmission to the second terminal. This use of the work "packet" is to be distinguished from the use of said word to refer to one or more blocks of data comprised in a single message, which usage is exemplified in U.S. Pat. No. 4,691,314 issued to Bergins et al.

In this specification the word "redundant" is used to describe either a message which substantially duplicates an earlier message or a message which, although it does not substantially duplicate an earlier message, has become superfluous as a result of a subsequent event such as a later message.

Figure 1:
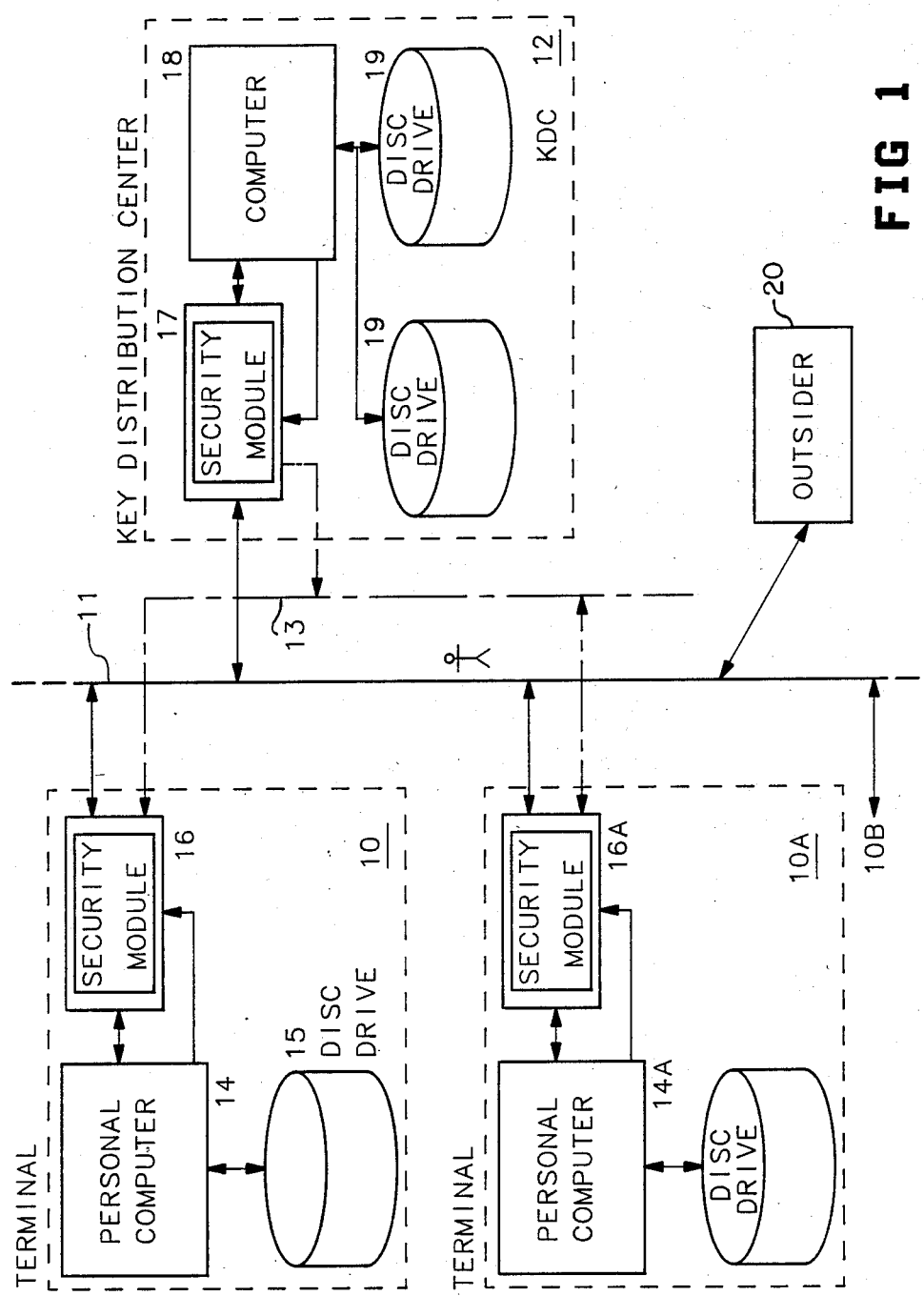
FIG. 1 is a block diagram of the system.

General system arrangement —FIG. 1

Referring to FIG. 1, the system comprises a plurality of terminals 10, 10A, 10B etc all connected to a common communications medium 11, and a central key distribution center KDC 12 which is responsible for the control and distribution of keys. There is also a non-electronic physical key distribution pathway 13 by means of which keys can be distributed from the KDC 12 to the terminals 10. Each terminal 10 comprises conventional terminal apparatus, such as the personal computer PC 14 and disc store 15 as shown, and security module 16, which can receive various encryption keys. The key distribution center 12 comprises a security module 17, a computing unit 18, and multiple storage means 19 so that there is negligible danger of loss of data. The security modules 16 and 17 are protected against outside interference, as indicated by the double enclosing lines.

The security module 16 is shown as being fed by a control line from the PC 14, for control purposes, and with a bidirectional data path to the PC 14. This latter path is used for passing data from the PC to the security module 16 for encryption for sending to another terminal, and for passing to the PC data from another module after decryption by the security module. This path is also used for passing data from the PC and back to the same PC, for local secure (encrypted) filing within the terminal and for decryption of that data when it is to be accessed again. The security module 16 is also shown as being connected directly to the communications medium 11. In practice, some form of interfacing with the medium 11 is required. Although this could be performed by the security module, it is in fact convenient for this to be performed by the PC 14; of course, the portions of the PC concerned with this will be logically distinct from the portions concerned with the clear data passing to and from the security module. (Also, of course, the PC will usually communicate directly with the medium 11 for sending and receiving non-secure messages).

The security modules 16 and 17 are constructed using known techniques. Thus each module includes data storage means for storing encrypting keys and other information which has to be kept secure; processing means for carrying out encryption and encryption of data, and other operations such as the calculation of check quantities and other processing required in the module; and control means for controlling the required operations. Each module also includes a battery, to avoid the loss of secure information such as keys in the event of temporary local power failure. The module also includes means for sensing a physical attack on the module and destroying all stored information in the module in the event of such an attack, eg by overwriting stored information such as keys with random data, so as to counter the possibility of an enemy trying to open up the module and extract useful information from it by making connections to individual components.

Many of the components of the module, such as various registers, counters and stores described later, are preferably implemented by means of a microprocessor, a random access memory, and a stored program which defines memory locations used for those components and implements their functions. (Some components, such as a random number generator and an encryption/decryption unit, are however for various reasons preferably provided by special-purpose hardware). The program is preferably stored at least partially in a PROM or the like so that part at least of the program cannot be altered once it has been written; the program thus cannot be modified to allow stored keys or other secure information to be read out from the module.

The system is assumed to be open to attack from an outside 20 tapping into the communications medium 11. Such an outsider may try to eavesdrop on messages, to intercept and remove messages, and to modify genuine messages and insert false messages. The medium 11 is distributed and not under the sole control of the users 10, 10A, etc; for example it may include parts of a public messaging system such as a telephone network or a packet switching system with store and forward means. Hence the activities of the outsider 20 do not have any inherently detectable characteristics. In addition to the potential attacks by such an outsider, the medium 11 is assumed to be inherently liable to faults, such as losing messages, subjecting messages to varying delays so that their order may be changed, and duplicating ("echoing") messages.

In addition to such possible interception and possible physical attack on the security module as noted above, an outsider might gain access to the module in the absence of the rightful user and attempt to gain entry to the system. To combat this, various techniques may be used. The security module may be settable to have password control, so that a password can be entered by the rightful user, with the module then only responding to that password If the user knows how long his absence will be, a time lock may be used; the internal battery of the module ensures that this will run continuously. The password may also be generated by the module and fed out to a floppy disc which can be physically removed and retained by the rightful user.

Slightly different protection techniques may of course be used for the security modules of the user terminals and that of the key distribution center, since the KDC is likely to be less vulnerable to attack than a user terminal, while on the other hand a successful attack against the KDC would be much more damaging that one against a user terminal General System Operation —Key Hierarchy The operation of the present system is controlled by the KDC 12 at two levels. First, each UA is assigned a unique User Master Key (UMK) by the KDC; this UMK is taken to the UA over the non-electronic channel 13 and installed at the UA (in the security module 16), eg by a member of the staff operating the KDC. This key is thereafter used to establish or verify messages between the UA and the KDC. Second, if a UA wants to communicate with another UA, then the KDC must be used to set up a secure channel between the two UA's. The UA requesting the link informs the KDC, which accordingly sets up the link, but thereafter participates in the use of the link only at infrequent intervals (when an LMK needs updating). There is also a third level of operation of the system, relating to the secure storage of information at a single UA; this operation does not involve the KDC.

The physical locations and the keys and their hierarchy, and the abbreviations used, are given in Table I. The message key is not shown as being in the hierarchy, because every message is encrypted under a different message key, generated solely for that message, whatever level of the hierarchy is involved for that message. In fact, every message is encrypted by using a pair of keys: one key, termed the base key, is a taken from the hierarchy, and the other is the message key for that message.

TABLE I

| Physical locations | |
|---|---|
| KDC — Key Distribution Center | |
| UA — User Agent (terminal or node) | |
| Keys | |
| UMK — User Master Key | |
| (KDC ⟷ UA) | |
| CDK — Control Data Key | MK — Message Key |
| (UA ⟷ UA) | |
| LMK — Link Master Key | |
| LDK — Link Data Key | MK — Message Key |
| (UA internal) | |
| PMK — Personal Master Key | |
| PSMK — Personal Sub-Master Key | |
| PDK — Personal Data Key | MK — Message Key |

If an outsider can accumulate enough messages encoded with the same key, he may eventually be able to break the system and recover the key. The keys are therefore changed at suitable intervals for this reason, and also so that if an outsider should somehow acquire a key, that will eventually become useless to him as a result of such key updating However, the UMK's are distributed physically, and changes to them are therefore difficult to achieve A hierarchical system of keys is therefore used, in which each key is changed repeatedly before any change is made to the key above it in the hierarchy. The superior key can be used to transmit information concerning the changes of a lower key. The KDC therefore only becomes involved in key changes involving the physical transport of keys (new UMS's) at relatively infrequent intervals, so that such updating does not become unduly burdensome.

Message Structure and UA Structure

The various UA's and the KDC communicate with each other by means of messages These messages all have broadly the same structure, though there are variations, as will be seen. One basic division of messages is into system messages and user messages; the former are generated by and acted on by the system without the knowledge of the user, while the latter are generated in response to users and contain user-composed data System messages are generally fairly short, and there are several different types; user messages are of very variable length, but only of essentially a single type. As will be seen, several system messages may sometimes be combined into a single packet.

The general structure of a message, and the hardware required for its generation at an originating UA and for response to a similar message received at the UA will be described here, with reference initially to messages between the UA and the KDC, and in particular to the first such message. Other system messages are dealt with in broadly the same way, but with minor differences, eg in the key levels involved.

Figure 2:
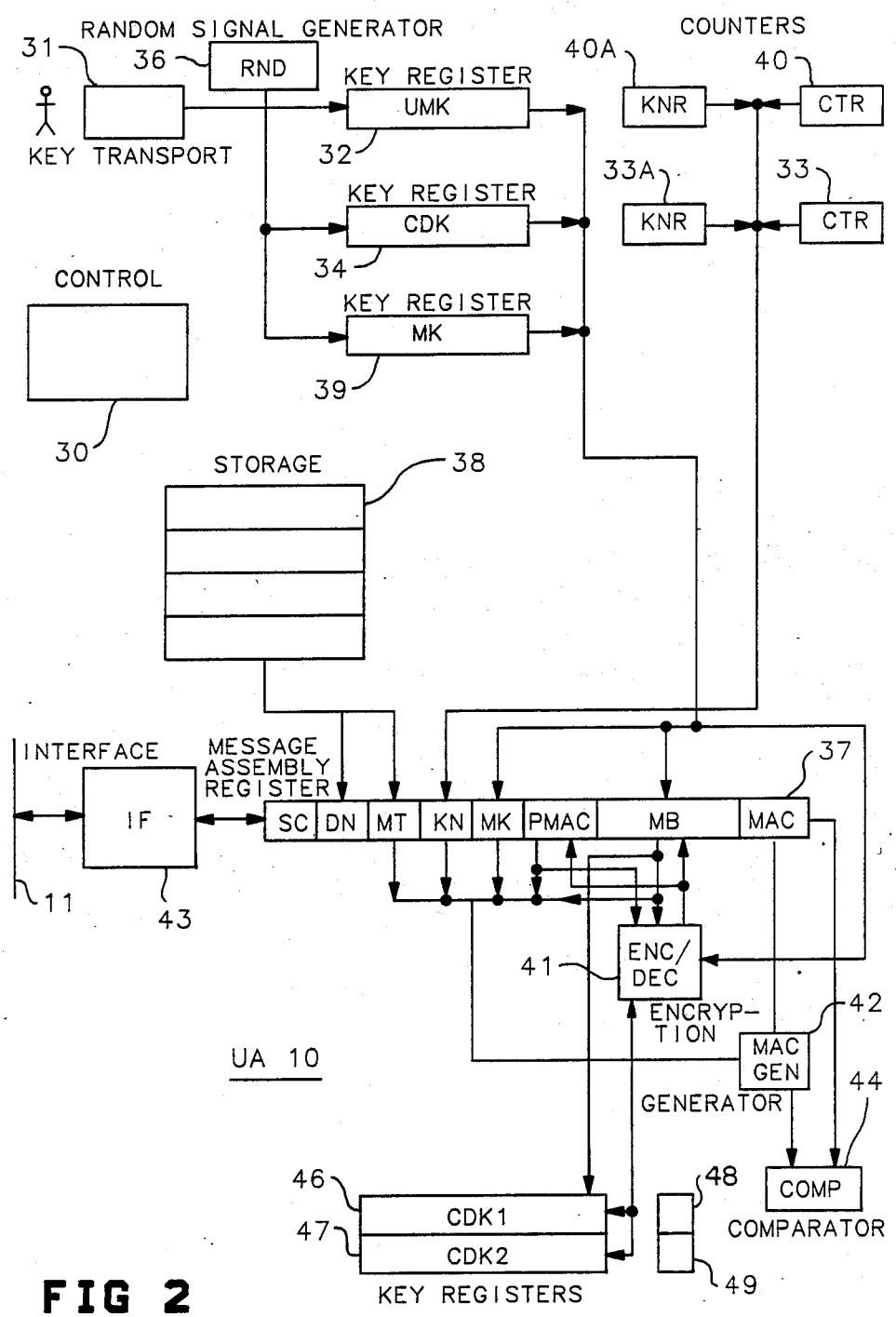
FIG. 2 is a block diagram of part of a User Agent (UA) terminal.

The system starts with the UMK's (User Master Keys) being distributed and installed at all the UA's (user agents), but with no other keys existing and with no communication links existing. Referring to FIG. 2, the UA includes various elements to be described, with general control functions over those elements being performed by control circuitry 30. The UMK for a UA is transported physically in a key transport unit 31, which is connected temporarily to the secure module 16 of the UA to transfer the UMK into a UMK resistor 32. A usage counter 40 is associated with the key register 32 to keep a count of the number of times the UMK has been used This counter, like all usage counters, is incremented each time the key is used, and is set to 0 initially (when the system is first started up) and each time the associated key is updated (ie replaced by a new key).

The UMK, while relatively permanent, can be changed after sufficient usage, by the physical transport of a new UMK from the KDC. A UMK key number register 40A is therefore provided, which is initially set to 0 and is incremented each time a new UMK is installed. (Alternatively, the register 40A can be set from the unit 31 each time a new UMK is installed, the KDC providing the new value).

As soon as the UMK is installed in the UA, a control data key CDK is generated and stored in the UA in a CDK register 34, with an associated usage counter 33 and key number register 33A. The key is generated from a random signal generator 36, which utilizes a random signal source such as a thermal noise generator or a radioactive decay counter, to ensure that the key is truly random. The CDK so generated is promptly sent to the KDC, by means of a suitable system message. In practice, such random generators generate bits at a relatively slow rate, and therefore include a register (not shown) for the next key (of typically 64 bits) The refilling of this register is started as soon as its contents are taken for a new key, so that the next random key will be available promptly. This generator is therefore included in the security module, because it contains a key in clear (ie not protected by encryption).

Considering the messages in more detail, the UA includes a message assembly register 37 with several sections, in which messages (including the present one) are assembled. The MB area of the message assembly register 37 is a message body or data section, and is used to contain the "meaning" or "data" (if any) of the message. The message assembly register 37 has at its left-hand end two sections, a source section SC and a destination section DN. The source section has a permanent source code stored therein representing the UA, while the destination section has a code indicating the required destination fed into it. The next section MT is a message type area, described below. The next section KN is a key number and message identifier section, described below. The next section is the MK section, which is used to contain the message key MK of the message. The MB area is followed by a message authentication code area MAC, and preceded by a PMAC (previous MAC) area, which for the present can be disregarded (or taken as filled with 0's).

A message type format storage area 38 holds a set of message type formats for system messages, such as the message to the KDC that a CDK is being sent, and the appropriate message type from this area is selected and passed to the message body area MB of the register 37. For system messages to the KDC, this storage area also holds the KDC destination code. Of course, for messages (user or system) to another UA, the destination code of the receiving UA must be produced Most communication with another UA is initiated by the user, so the destination code of the receiving UA is determined by the user; this code is of course used by system messages to it as well as by user messages to it. A conventional table look-up system for obtaining the destination code from a mnemonic for the destination can of course be used; also, the routing or addressing of the message through the medium 11 will usually be handled by an interface unit 43 discussed below.

As noted above, each message is encrypted using two keys, a base key from the key hierarchy and a message key. The key number section KN of the register 37 contains a key number combination for the message which identifies the base key used for the message and also acts as a message number which uniquely identifies the message. This message number is obtained by concatenating the key numbers of the keys down the hierarchy to the base key, together with the usage count of the base key. Each key register has an associated key number store, 40A for the UMK in register 32 and 33A for the CDK in register 34. Thus if the base key is a UMK, the contents of register 40A and counter 40 are used, while if the base key is a CDK, the contents of registers 33 and counter 33 are used. Each key number is incremented by 1 each time the associated key is changed Hence for a given message type, the message numbers are in strictly ascending order, because the key numbers for each key are normally rising, and when such a number falls, by being reset to 0, that is as a result of the next number up the sequence being incremented. The branch of the hierarchy involved and the distance down the hierarchy will be identified by the message type; for example, for the message type "CDK being passed to KDC" being considered here, the key hierarchy necessarily involved only the UMK.

It should be noted that although the key number of a key is similar to the usage count of the next key up the hierarchy, the two will not necessarily be identical. This is because in some circumstances a higher key in the hierarchy can be used, and so increasing its usage count, without the next key down being changed. To avoid such problems, the usage counts and key numbers are therefore maintained distinct throughout the system. (This also means that the message numbers are not necessarily sequential).

(This system depends to some extent on the MT contents indicating the message type in clear. It could of course be modified, eg by including the MT contents as part of what is encrypted; the length of the message identifier (ie the key number) or, what is the equivalent, the level of the key in the hierarchy, would then have to be indicated separately).

In general, the body of each message is encrypted using a unique key for that message, the message key MK. This message key is generated by the UA by means of the random key generator RND 36, and fed into a message key register MK 39.

It is assumed that the cryptographic system used is one in which the same key is used for encryption and decryption, such as the DES/DEA standard or something similar. (It would be possible to use a system with different encryption and decryption keys, such as a "public key" system, but that would require both keys of a key pair to be stored, and the appropriate one to be used for encryption and decryption). The encryption technique used is CBC (Cipher Block Chaining), which requires an initialization vector IV and an encryption key. (This is described for example in ANSI standard X3.106-1983 Modes of Operation of the DEA). An initialization vector IV is first generated by encrypting the message key MK under the base key. An encryption key for the message is then obtained by encrypting the IV again under the base key. Since the message key MK is sent in clear and the receiver has a copy of the base key, the message can be decrypted at the other end, by encrypting the message key under the base key to yield the initialization vector and again to yield the decryption key; the IV and decryption key are then used to decrypt the message. The use of a different MK for each message means that if a message is repeated in almost the same form (eg the same user message being sent a second time with perhaps only a time change), it will be encrypted under a different key, so an outsider will not be able to gain much assistance from the repetition in trying to breach the encryption.

After a message is encrypted, the contents of the MT, KN, MK, PMAC, and MB section of the message assembly register 39 are passed to a Message Authentication Code calculating unit MAC 42, in which a MAC value is calculated, and that value is passed back to the MAC section of the message assembly register 37. The MAC value is thus included as part of the message. The MAC is calculated by an encryption-like process ("MAC-ciphering") using the CBC technique. The final block resulting from this process forms the MAC. The "MAC-ciphering" is done using a key and an initialization vector (IV); the key (the "MAC-cipher-key") is obtained as a fixed function of the base key used for encrypting the message, and the IV is taken as zero. The source code and destination code do not need to be authenticated, because if either is altered in any way, the unit which actually receives the message —a UA or the KDC —will be unable to authenticate the message, because it will not be using the proper key in attempting authentication by the MAC check.

The encryption/decryption unit 41 and the MAC generator 42 must be inside the security module, because they have to receive keys in clear. Similarly, the UMK register 32 must be inside the security module, because it contains a key in clear. While it would be possible to store other keys outside the module, encrypted under the UMK and being decrypted in the module when required, it is much more convenient to store all keys in clear in registers inside the module. The message assembly register 37 is also of course inside the module, to keep the message inviolate before it is encrypted and authenticated.

Each message sent or received is passed through an interface unit 43 which performs any lower level protocol processing which may be required to interface with the transmission medium 11. In particular, the interface unit 43 may be a mailbox specifically devoted to transmission of encrypted messages, or two such mailboxes, one for system messages and the other for user messages This permits a further mailbox to be used for unencrypted messages, which are sent and received in clear (eg from terminals not forming part of the secure messaging system) As noted above, this interface unit is preferably implemented by means of the PC 14 (FIG. 1).

Considering now the receiving circuitry, the register 37 is used to receive incoming messages which are received from the medium 11 via the interface unit 43. The message number KN of the message is inspected to check that the corresponding base key is available. The MAC of the message is then checked by means of the MAC generator unit 42, using the base key identified from the message identifier KN as the "Mac-ciphering" key. The resulting MAC is compared with the MAC of the message (in section MAC) by a comparator 44. If the computed MAC and the message MAC match, then the message is taken as authentic; if they do not, then the message is discarded, as it either has an error of some kind in it (perhaps as a result of transmission noise) or has been tampered with If an outsider 20 tries to modify a message, he will be unable to change the MAC of the message to be consistent with the changed message, because he will not be able to correct the MAC of the message, which is protected by being calculated with a key which is unknown by the outsider.

The message number KN of the message then is inspected to check that the message is not a repetition of one that has been received previously. It can be checked to see if the message number is reasonable, having regard to the message numbers previously received. (The provisions regarding missing messages, duplicated messages, and messages received in the wrong order are discussed at length later).

If the message passes the KN and MAC tests, then (assuming that the message body section MB is not empty) the message is decrypted. For this, the message key in the MK section is encrypted under the base key (identified by the message number) using the encrypt/decrypt unit 41 to obtain the IV, and this is encrypted again under the base key to obtain the decryption key. (The IV and decryption key for decrypting are the same as the IV and encryption key for encrypting). The IV and decryption key are fed directly into the encrypt/decrypt unit 41 to be used to decrypt the contents of the MB section (Some system messages, eg certain acknowledgement messages, have no "body"—their MB part is empty).

The contents of the MB section are then a system message of some kind, and this is acted on by the control circuitry 30. Still assuming that the message has been received from the KDC, it may well contain a CDK key. If so, then that received key is fed into a CDK1 register 46 or a CDK2 register 47. There is a pair of received CDK registers because when a change of CDK in the KDC occurs, it is possible for a message using the previous CDK to be received after the new CDK has been received. There are two received CKD number registers 48 and 49, which have the corresponding CDK numbers (also from the MB section) feed into them, so that the appropriate CDK can be identified when a message encrypted by a CDK is received Since the CDK is changed only after a fixed substantial number of messages encrypted under it have been sent, it is safe to assume that there will never be a need to keep more than one previous CDK. (There will be something else radically wrong if a discarded CDK is needed).

UA to KDC linkage

The system starts with the UMK's (User Master Keys) distributed and installed at all the UA's (user agents), but with no other keys existing and with no communication links existing. As soon as the UMK is installed in the UA, a linkage must be established between the UA and the KDC. To start this, a control data key CDK is generated and stored in the UA in the CDK register 34, and a system message is constructed (with its unique message key MK in register 39) and sent to the KDC, encrypted under the UMK. The KDC is thus informed that the UA has had the UMK installed, and the CDK is installed at both ends of the link between the UA and the KDC, so that it can be used for future communication from the UA to the KDC. The KDC acknowledges the receipt of the CDK by sending an acknowledgement message back to the UA.

In addition, the KDC generates a CDK of its own, in the same way, for the UA and sends this to the UA, encrypted under the UMK. The UA receives this message, and decrypts it to obtain the CDK from the KDC. Thus the link between the UA and the KDC is established with a pair of CDK's, one for each direction. Each end of the link uses the CDK which is generated to encrypt further messages, and uses the CDK received from the other end to decrypt further messages received from the other end of the link. This use of pairs of keys for the two directions in which messages can pass occurs also with links between UA's.

The acknowledgement by the KDC of the receipt of the message containing the CDK from the UA need not be a separate and distinct message, but may instead be contained as part of the message from the KDC sending its CDK to the UA. That message is in turn acknowledged by the UA. Thus the exchange of CDK's may be achieved by 3 messages; the CDK from the UA to the KDC; the acknowledgement of receipt with the CDK from the KDC to the UA; and the acknowledgement from the UA to the KDC.

The link between the UA and the KDC is thus bidirectional, with a distinct CDK for each direction. Once the link between the UA and the KDC has been established in this way, almost all further messages between the two units are by means of the CDK's as base keys. When the usage of a CDK exceeds the preset limit, a fresh CDK is generated, and transmitted under encryption by the UMK as described above. Since the message flow between the UA and the KDC is relatively low, this hierarchy of 2 levels (UMK and CDK) is sufficient to table the system to run for a time which requires changes to UMK's only rarely. In fact, the usage of UMK's is dependent also on certain communications between UA's, when the new LMK's are required, as will be seen below. Messages between the UA and the KDC are required in general only when a user (UA) wishes to establish or break a link with another user (UA), which will occur only rarely (as links are regarded as substantially permanent), and for updating LMK's.

In general, the number of messages (whether user or system) flowing in the two directions over a link need not be the same; subsequent updates of fresh CDK's will therefore involve the updating of only a single CDK for the link, which will involve the sending of the new CDK one way and the sending of an acknowledgement message the other way.

If required, the KDC can be programmed, when the system is first set up, to all links initially required. This involves storing in the unit 31 (FIG. 2) for each UA a considerable number of system messages, which thus do not require encryption (because they are transported with the UMK's and their security is physical, like that of the UMK's), which would otherwise have to be sent between the KDC and the various UA's when the system first became operational. This would markedly reduce the initial quantity of system messages involving the KDC.

Figures 3, 5:
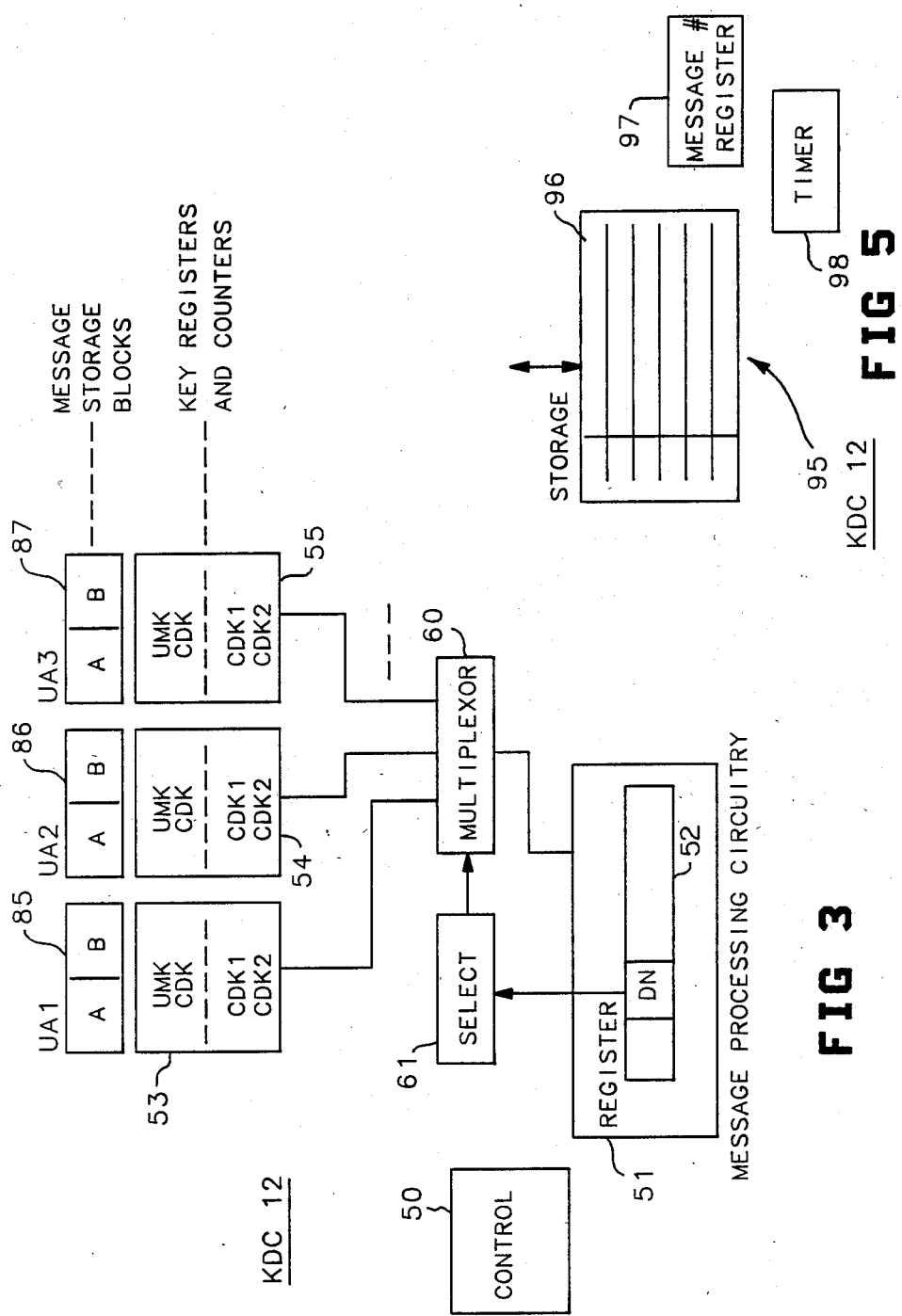
FIG. 3 is a block diagram of the Key Distribution Center (KDC).
FIG. 5 is a more detailed block diagram of a UA terminal.

The structure of the KDC is similar to that of the UA, and is shown in block form in FIG. 3. There is a control unit 50 (corresponding to control unit 30 of the UA shown in FIG. 2) and single message assembly and processing circuitry 51, which includes a message assembly register 52 (corresponding to register 37); the associated circuitry of encryption/decryption unit, MAC generator, and MAC comparator are regarded here as part of the message assembly and processing circuitry 51 and so not shown separately. The KDC has a separate set of key registers and usage counters for each UA; these are shown as blocks 53, 54, 55, ... for the keys used by the KDC for sending (ie corresponding to the registers 32, 34, and 39 and associated usage counters and key number registers), and for the keys used by the UA's for sending messages to the KDC (ie corresponding to the registers 46 and 47 and associated registers 48 and 49).

The blocks 53, 54, 55, ... are multiplexed to the message assembly and processing circuitry 51 by a multiplexer 60 which is controlled by a selector circuit 61. The contents of the selector circuit 61 select the appropriate one of blocks 53, 54, 55, ... for obtaining the keys for dealing with received messages and preparing messages to be sent out. Thus when a message is received, the selector circuit 61 is filled with the contents of the SC section of the register 52, this section containing the source code of the received message and thus identifying which UA the message has come from. If a reply message is to be sent back to the UA which sent the received message, the selector contents are left unchanged, so that the appropriate one of blocks 53, 54, 55, ... remains selected for the preparation of the reply message. If however a message is to be sent out to a different UA, then the contents of the selector circuit 61 must of course be changed accordingly. This may happen, for example, when a link is being established. The message from UA1 to the KDC requesting the establishment of the link contains, in its MB portion, the code for UA2, and this code must be transferred to the selector circuit 61 for sending the appropriate message to UA2. The two codes are in this case used in alternation by the selector circuit 61, as messages are received from and sent to UA1 and UA2.

Communication between UA's

For communication to be possible, links must be set up between pairs of UA's. Each such link is set up by a UA requesting the KDC to set up a link between it and another specified UA. The KDC then sets up the requested link, provided that neither of the UA's which will be involved in the link exceeds an upper limit on how many links it can have with other UA's, and that the UA on the "receiving" end of the requested link does not refuse to accept the link. Once the link has been set up, it is symmetric in that the UA's at the two ends are on an equal footing; either can transmit to the other, or decide to break the link.

The process of setting up the link is summarized by Table IIA, where the UA requesting the link is called UA1 and the UA with which UA1 wants a link is called UA2.

TABLE IIA

| UA1 |     | KDC: | UA1 asks the KDC for a link to UA2 |
|-----|-----|------|-------------------------------------|
|     | UA2 |      | KDC: sends transmitting and receiving LMK's to UA2 |
|     | UA2 |      | KDC: UA2 acknowledges receipt |
| UA1 |     | KDC: | KDC sends the keys to UA1 |

In more detail, when the user of UA1 wants to set up a link with UA2, which is another UA specified by the user of UA1, UA1 sends a system message to the KDC. This system message is sent encrypted using as base key the CDK key of UA1, which is the key which UA1 uses for system messages to the KDC (except, of course, for systems involving CDK updating). The message type indicates that UA1 is asking for a link to be set up, and the message body includes the code of UA2. On receiving this message, the KDC generates a random pair of LMK's, and sends a message to UA2, the message type asking UA2 if it wants to accept a link with UA1, and the message body including the code of UA1 and the two LMK's, all encrypted using as base key the CDK used for sending messages from the KDC to UA2. When UA2 receives this message, its user has to decide whether or not to accept the link. If the link is accepted, a message is sent from UA2 to the KDC indicating that acceptance, and encrypted using as base key the CDK used for sending messages from UA2 to the KDC. The KDC, on receiving this message, sends a message to UA1, indicating acceptance of the link by UA2, and including the code for UA2 and the two LMK's, encrypted using as base key the CDK used for passing messages from the KDC to UA1.

The result of this is that the two UA's, UA1 and UA2, now have a shared pair of LMK's which they can use to communicate with each other directly.

There are certain circumstances in which a link may not be achieved. As a practical matter, the UA's are provided with only a limited capacity for maintaining such links. Hence if UA1 already has the maximum possible number of links, it will refuse to attempt to set up another link. The user has the option of breaking an existing link so as to create the capacity for his UA to accommodate a new link. Also, UA2 may already have the maximum number of links; it then returns a system message to the KDC indicating thus, and the KDC in turn sends a system message to UA1 indicating that the requested link has been refused. (If desired, UA2 may be arranged to indicate to its user that UA1 has requested a link, so that its user has the option of breaking an existing link to create the capacity to accept the requested link with UA1). In addition, as noted above, if UA2 has such capacity, its user is asked whether the requested link is to be accepted, and if the user refuses, the UA2 again sends to the KDC a system message indicating the fact. Such system messages to the KDC cause the KDC to send corresponding messages to UA1 indicating what has happened, and the user of UA1 will thus be informed that the requested link has been refused. (It is usual in secure systems that when a user request has been refused, no reason for the refusal is given).

FIG. 4 shows the layout of a UA, in less detail than shown in FIG. 2. The message assembly and processing circuitry is shown as block 75, including the message assembly register 37, the encrypting/decrypting unit 41, and the MAC generator 42. There are several blocks of key registers and associated circuitry. Block 70 contains the various key registers shown in FIG. 2 and their associated counters, all concerned with communication with the KDC. Blocks 71, 78, ... contain similar key registers and counters, but each block is concerned with communication with a different UA. Thus each of these blocks contains a UA address code register (registers 73), identifying which UA that block relates to. These registers are filled with the UA address codes as the user of the UA requests and is granted links with them and as they request and are granted links with the present UA. The blocks 70, 71, 72, ... are selected by a multiplexer 74. In the case of block 70, for the KDC, the selection is directly controlled by the SC section of the message assembly register 37 or the control circuitry 30; in the case of the other blocks, the selection (in response to incoming messages) is determined by comparing the address code in the SC section of the register 37 with the contents of the various registers 73. For selection for transmitted messages, selection may be determined by the user (in practice indirectly by means of a table stored in the PC 14 storing user-defined UA identifications against their address codes).

It will be realized that the blocks 71, 72, ... do not include a UMK register, there is of course only a single UMK, for both transmitting and receiving, for a UA, resident in block 70, and forming the top level of all hierarchies of keys. Each of these blocks contains two transmitting keys, LMK and LDK, and two of each level of the receiving keys —in this case, LDK1 and LDK2. Because the lower level key LDK changes relatively infrequently, once every say 50 messages, it is unnecessary to keep more than the current and immediately previous versions; and because the higher level key LMK changes, even though infrequently, it is necessary to keep the previous version as well as the current one, to cater for the times when it has just changed.

Once the link has been set up, user messages can be sent from UA1 to UA2 and vice versa. Although the link must obviously be set up in response to a request by a single UA, it is symmetrical once it has been set up. To send a user message, the process is broadly similar to the sending of a system message. However, the message body section MB of register 37 is of only limited length. A selector switch 76 is included in the connection from the MB section of register 37 to the encryption/decryption unit 41, and for user messages, the body of the message is fed into the unit 41, and for user messages, the body of the message is fed into the unit 41 as successive 64-bit blocks from the PC 14 instead of from the register section MB, and the encrypted message is fed back block by block to the PC 14 (which at this point is acting as the interface unit 43). The MAC of the messages is then calculated and fed into the MAC section of register 37. The message length may be indicated either by a length value included as part of, say, the MT section, or as the first part of the message body.

The MAC unit 42 may be arranged to operate at the same time as the encryption, so that before the encryption of the message body starts, it has fed into it the contents of those sections of register 37 to the left of the MB section, and then the encrypted message body is fed into it, block by block, as it emerges from the unit 41.

This makes the final MAC available immediately after the last encrypted block of the message body. However, the calculation of the MAC in fact involves a process identical to encryption, so it is preferably done in practice by using the encrypting/decrypting unit 41 (so that the MAC unit 42 does not exist as a unit physically distinct from the unit 41, though of course its logical function remains distinct). In this case, of course, the MAC cannot be calculated in parallel with the encryption, and must be calculated after the encryption.

When a user message is received, a special user message acknowledging receipt is generated automatically and returned to the sending UA if the sender requests it; such a request is indicated by an appropriate message type MT.

Because the medium 11 is unreliable, it is necessary to make provisions for the possible loss of a message, reversal of the order of two messages, and duplication of a message by the medium 11. These provisions differ for user and system messages; the provisions for user messages will be discussed here. It is of course impossible to detect the fact that a message is missing until a later message is received These provisions consist primarily of a pair of bit registers (bit maps) 77 and 78 associated with the two received LDK registers LDK1 79 and LDK2 80. Each of the blocks 71, 72, ... contains a respective set of these registers; the set for block 71 is shown in FIG. 4A. Each of the registers 77 and 78 has a length, in bits, equal to the count at which the LDK key counter in the corresponding sending UA is reset to 0. As each user message is received, the bit corresponding to the usage count of the LDK of the sending UA (which is part of the message number KN) is set. If the bit for a received message is already set, that indicates that the message has already been received; hence the current version is a duplicate and is discarded by the system.

No system action is normally taken if a user message is not received. In fact, the system does not allow missing user messages to be identified, because the message numbers are not necessarily sequential, so a clear bit preceding a set bit may mean that there is no user message with that number rather than that a user message has not yet been received.

The system could be modified so that the absence of a user message can be identified once the next message is received. This could be done, for example, by giving the user messages strictly sequential numbers as well as the existing message numbers, or by including in each user message the message number of the preceding user message. But even if this is done, it is preferable to leave the user to decide what action to take when he finds that a message has not been received. It may be for example that an apparently missing message has been merely delayed rather than lost, and is still en route in the system. The user can choose either to leave things as they are or to send a user message of his own to the user of the other UA asking for a retransmission of the missing message. Such retransmission will be performed as a transmission of an entirely fresh user message as far as the system is concerned; it is up to the sending user to include an indication that the new message is in fact a repeat of a previously sent but lost message.

As stated above, the receipt of a user message may trigger the sending of an acknowledgement message which is automatically generated by the system as a special kind of user message. Optionally, therefore, the UA's may be arranged to keep a record of such messages sent, the record being updated when acknowledgements of receipt are returned. This can be achieved by means of bit maps in which bits are only set for messages the message type of which specifies automatic acknowledgement, or by keeping a log of the message numbers of such messages. If this is done, the user can determine which of his user messages requiring acknowledgement have not been acknowledged, and resend them as he thinks fit. Of course, the absence of an acknowledgement does not necessarily mean that the original message did not reach the intended destination; it may mean merely that the acknowledgement did not reach its intended destination. It is therefore expected of the user to indicate as a matter of courtesy and good practice, whenever he sends a message which is a true repeat, that it is a resending of a previous message.

It will be realized that the initial setting up of a link may be accomplished by various possible message sequences between the two UA's and the KDC. Two such alternative sequences are given by Tables IIB and IIC:

TABLE IIB

| | | |
|---|---|---|
| UA1 | KDC: | UA1 asks the KDC for a link to UA2 |
| | UA2 | KDC: KDC asks UA2 if it will accept a link with UA1 |
| | UA2 | KDC: UA2 acknowledges and agrees |
| UA1 & UA2 | | KDC: KDC sends receiving keys to UA1 and UA2 |
| UA1 & UA1 & UA2 | UA2 | KDC: UA1 and UA2 acknowledge receipt KDC: KDC sends sending keys to UA1 and UA2 |

TABLE IIc

| | | |
|---|---|---|
| UA1 | KDC: | UA1 asks the KDC for a link to UA2 |
| UA1 & UA2 | | KDC: KDC sends receiving keys to UA1 and |
| UA2 | | |
| UA1 & UA2 | | KDC: US1 and UA2 acknowledge receipt and UA2 accepts |
| UA1 & UA2 | | KDC: KDC sends sending keys to UA1 and |
| UA2 | | |

These sequences are more complicated than the sequence of Table IIA, in that at some stages, two messages are sent out simultaneously from the KDC, and two messages are returned more or less simultaneously to the KDC. Also, the sequence of Table IIB involved 6 rather than 4 stages, so the sequence of Table IIC is preferable to that of Table IIB.

In both these sequences, the process is aborted at the stage of the third message if UA2 refuses to accept the proposed link. If that happens, UA2 sends a message of refusal to the KDC as the third message, and the KDC sends a "link refused" message to UA1 as the fourth and final message. It will be noted, with the last two sequences, that each UA receives its receiving key before the other UA receives its sending key. This means that a UA cannot send a message to another UA before the latter UA has the necessary key to receive that message.

With the sequence of Table IIA, UA1 cannot send a message until UA2 has received the sending key of UA1, but UA2 obtains its transmitting key before UA1 receives it (as UA1's receiving key), and so UA2 could transmit a message to UA1 before UA1 has the requisite key to decrypt it. This situation can only arise when the link is initially set up. It is probable then that UA1, which has requested the link, will first want to send a message. But it could happen that UA2 tries to send a message before UA1 has received the key for decrypting it. The result will be that the message is refused by UA1, which will recognize from the message number that it does not have the key necessary to decrypt the message. One option here is to simply reject the message, so that it is effectively lost. If the message is a system message, action is taken as discussed later; if it is a user message, this will be dealt with as discussed above, with the sending probably being left to his own resources to discover that the message was not received. Optionally, the UA's could be arranged to store such messages to await the receipt of the keys to decrypt them.

After a link has been established, a UA may want to terminate it, if the user is confident that he will have no further need to communicate with the UA at the other end of the link, or if he wants to establish another link and already has the maximum number of links that the UA will accommodate, so that he can only make room for the new link by terminating an existing one. To achieve this, UA1 deletes from itself all information relating to the link and sends a link terminating system message to the KDC. The KDC logs this and sends a system message to UA2 instructing it to delete from itself all information relating to the link. The KDC logs a link deletion as an error if the deletion relates to a link which does not exist. (Such an "error" can arise naturally if both ends of a link request termination of the link at the same time, as one message will reach the KDC and terminate the link before the other message reaches the KDC).

System Message Error Recovery

As noted above, messages may become "lost" in various ways and may also become duplicated (either by a quirk of the medium 11 or by being recorded and deliberately replayed by an outsider). For user messages, the way in which such events are dealt with has been described above; for system messages, the way in which such events are dealt with will now be described.

With system messages, it is essential that none are lost and that they are dealt with in the correct order. For each link of the UA (ie the permanent link to the KDC and each link to another UA), all system messages (apart from simple acknowledgements) sent out on that link are stored. They are deleted from the store in two circumstances: when acknowledgement messages for them are received, or if they become redundant. Each time a new system message is sent, a message packet is prepared in which all the previous system messages in the store are included, in the proper order, with the new system message being the last in the packet. Thus each time a new system message is generated, all old system messages which are unacknowledged and non-redundant are added to its front end, and all the messages —the old ones plus the new one —are sent as a packet. So the receiver will receive a fresh set of all unacknowledged system messages, in the right order, every time a fresh system message is generated. It follows that the receiver necessarily acts on system messages in the correct order, because any message is preceded by all previous unacknowledged and non-redundant messages in the proper order. Of course, the receiver may by then have received an earlier packet of some of these system messages, which it will already have acted on. The receiver keeps, for each link, a record (by message number) of the last message which it has acted on, so it will ignore all duplicate messages, including in particular all such messages in the current packet; it will start to respond to those in the current packet as soon as fresh ones are reached.

An acknowledgement message may be a simple acknowledgement message which does nothing more than acknowledge the receipt of a message, or it may be an ordinary system message, carrying some information, which is generated in response to an incoming system message and therefore implicitly acknowledges that preceding message. A system message becomes redundant when its effect is nullified by a later one; for example, a message requesting the setting up of a link is nullified by a later message requesting the cancellation of that link.

Strictly speaking, duplicate messages are not totally ignored When one is detected, a simple acknowledgement is sent back to the sender, though the message is not acted upon any further. This is because the acknowledgement of the original message may have become lost in the system; if the sender had received an acknowledgement for the message, the message would not be re-sent. So if an acknowledgement of the duplicate message was not sent, the sender might go on sending it repeatedly. If the sender receives an acknowledgement for a message, it can however safely delete from the resend store all messages with message numbers up to and including the message number of the acknowledged message, because a message can only be received, acted on, and acknowledged by the receiver if all preceding messages have been duly received.

This ensures that all system messages are acted on in the proper sequence, and the automatic resending each time a fresh message is generated ensure that the latest message is not delayed by resending of earlier ones. In addition, there is a second way of resending messages. If a sufficiently long interval passes after the sending of a message packet without the generation of a fresh message and without the receipt of an acknowledgement, the existing packet of stored messages in the store 95 is re-sent automatically.

In preparing such a message packet, the messages are sent in exactly the same form each time. They are however re-encrypted, under the current base key. It would be possible to send the entire package as a unit or single message. However, it is preferred to send it in such a form that the individual messages in it can be acted upon as they are decrypted, so that if the message is interrupted or damaged, only part of it is lost, and the receiver is brought part way towards an up-to-date state. This means that the authentication of the package must be designed so that this can occur, while the packet is still protected from interference so that an outsider cannot trick the system into responding to false messages.

The format of a packet begins with the usual "header" information in the left-hand end of the message assembly register: SC, DN, MT, KN and MK sections. The contents of the MT section include an indicator bit indicating that the message is a packet of more than one message; the message number in the KN section is the message number of the current message (which will be the last in the packet). The first message of the packet is a stored message. For this, as for all the stored messages to go into the packet, the source and destination codes are not required, nor is a special MK required. It is therefore assembled as an abbreviated message, consisting of its message type MT (with the indicator bit if it is not the last of the stored messages), the message number KN, and the message body MB (if any). It also includes section PMAC, which (as for a single message) is blank. The MAC for the packet as assembled so far is calculated and entered in the MAC section.

The next section of the packet is now assembled, incorporating the next stored message or, if all the stored messages have been included, the current message. For this, the MAC just calculated for the previous message of the package is entered into the PMAC (previous MAC) section, and this PMAC value is encrypted and included in the field covered by the new MAC calculated for the message being incorporated in the current section of the packet. This process continues until the current message forms the final part of the packet (the MT and KN portions not being included in the MB portion for the current message, since they have already been included in the header of the packet).

It is evident that this packet structure allows a packet to be disassembled, decrypted, and acted upon message by message. In addition, the individual messages and their sequence are both authenticated by the sequence of MAC's; each MAC confirms the integrity of the message which it follows, and because each message has the MAC of the previous message included in it, any change of sequence (by reordering, omission, or repetition of messages) will cause the MAC check to fail as soon as an out-of-sequence message is reached.

The receiver responds to the individual messages of a packet individually, except that any response messages (apart from simple acknowledgement messages) are not sent out immediately, but are put into the message store and only sent out (together with any old unacknowledged messages) as a single packet when the incoming packet has been completely dealt with. (Otherwise, the responses would have to be sent out repeatedly, as a series of packets of increased lengths).

As described, the packet length is indicated implicitly by the chaining of the messages and the inclusion, in the MT of each message, of a bit indicating whether or not there is a subsequent message. This of course enables the receiver to distinguish between retransmitted messages, which have their MT and KN in the MB body, and the current message (the last message in the packet) which has its MT and KN in the packet header. An alternative technique would be to include a packet length value (i.e. the number of messages) in the header, as part say of the MT or KN sections. This retransmission of all unacknowledged system messages each time a new system message is generated involves very little unnecessary retransmission. It is only if a message has been correctly received but its acknowledgement has not yet been received by the original UA, or has gone astray, that the retransmission can reasonably be argued to be unnecessary. An alternative is for the receiver to keep a record of the message number of the last message received, and, if it finds that a new message does not have the next successive message number, to send a request for retransmission of the missing messages. But this technique involves using strictly sequential message numbers, and also gives a delay of two message transmission (request and response) before the receiver can act on the current message, and if either of these "recovery" messages goes astray, still further delay. It may also be noted that system messages are relatively short, so the cost of retransmitting all unacknowledged messages in a packet is unlikely to be excessive. This is in contrast with user messages, which are of very variable length and may be very long.

Since a packet is of substantial and variable length (compared to a single user message), it is prepared for retransmission in broadly the same way as a user message, with successive blocks being fed into the encryption/decryption unit and the encrypted and authenticated message being accumulated in the PC 14, acting as the interface unit 43, as it is generated.

The apparatus involved in these operations is shown in FIGS. 3, 4, and 5. In a terminal (UA or KDC), for each link from that terminal there is a respective system message storage block; blocks 85, 86, 87, ... for the links to all terminals UA1, UA2, UA3, ... in the KDC (FIG. 3), and blocks 90, 91, 92, ... for the links to the KDC and for the linked terminals UA-I, UA-II, ... for each UA terminal (FIG. 4). These blocks are of course linked to the message assembly and processing circuitry 51 or 75 through the multiplexers 60 or 74.

FIG. 5 shows the main components of block 85; the other blocks are substantially the same. There is a store 95 for storing unacknowledged system messages, which is operated somewhat as a FIFO (first in first out) store but with non-destructive readout. System messages are fed into it from the top, and move steadily down until they are deleted. The messages in the store 95 have their message numbers KN stored with them in section 96. A register 97 stores the message number RXKN of the last acknowledged message, and when this changes, messages are deleted from the store upwards to the message with a message number matching that in register 96. When a new system message is being prepared, all old messages still in the store 95 are non-destructively read out upwards, ie oldest first; the new message is then entered in the top of the store (and all messages already in it are pushed down).

There are in fact two classes of system messages, depending on the level of the base key in the key hierarchy, and these have message number KN in different sequences. The store 95 and register 97 are therefore duplicated, so that messages of the two classes are stored separately, block 85 comprising two sections A and B for the two classes. The messages of the higher base key (ie the base key higher in the hierarchy) all precede those of the lower base key in the packet. This means that the messages are not sent in strictly the same order as they were originally generated. However, the effect of this is only that some new keys may arrive slightly earlier than they would otherwise.

The block 85 also contains a timer TMR 98, which is used to measure the time elapsed since a system message was last sent, and trigger a resending of unacknowledged system messages when that time exceeds a preset limit. This timer is reset to 0 every time a packet is sent.

The blocks 90, 91, 92, .. in each UA are included in the security module, so as to keep the list of messages awaiting retransmission secure from possible outsiders. In the KDC, however, the corresponding blocks 85, 86, 87, ... are not included in the security module, but on backing store, for various reasons. Since the KDC has links with all UA's, the quantity of stored messages is likely to be much higher than for the UA's; the loss of the stored messages (eg by a failure of the computer 18) is not so serious as a corresponding loss at a UA, since (as will be discussed later) the KDC has back-up and restore procedures; and the KDC is less likely to be attacked by an outsider than a UA. This KDC information stored on the backing store is protected against corruption, either accidental or deliberate, by the local message storage technique described in the next section.

Local Message Storage

There are situations in which it is desirable to be able to store messages secure at a UA. Thus a user may want a received user message to be stored securely, either because he is not there when it is received or because he wants to keep it. A user may also want to securely store, in the UA, user-message-like material which he is generating. The present system provides both these facilities.

If a received message is to be stored in the UA, it is stored in the backing store 15 in the form in which it was received, ie without decryption. This means that if an outsider gains access to the stored message, he can gain no more knowledge than he could have gained by intercepting the message on the medium 11, and in particular, he cannot gain anything by comparing the message as it appeared on medium 11 with the message as stored in the backing store 15. But the user must be of course able to decrypt the message for himself later. Accordingly, the message has appended to it the LDK under which it was encrypted. This LDK must itself be in encrypted form, since there are no circumstances in which keys can be allowed outside the security module in clear, so it is stored encrypted under the LMK above it in the key hierarchy. That LMK is also appended to the message, again in encrypted form, encrypted under the UMK which is at the head of the hierarchy. The UMK itself cannot be encrypted, as it is at the head of the hierarchy, nor can it be stored in clear as part of the message. Instead, its identification number is appended to the message as stored.

It is important that keys should not appear in two different forms. Each key (apart from the UMK's) was received encrypted under a base key (the key above it) and a message key. The keys are stored in clear (ie after decryption) in the security module in the blocks 70, 71, 72 ...; each key is therefor also stored in these blocks in the encrypted form in which it was received, along with the MK which was used for its encryption. When a key is appended to a message, the stored encrypted form and the associated MK are used to form the appendix.

The UA contains a UMK history store UMKH 105, FIG. 4, in which the present and past UMK's are stored with their serial (identification) numbers. When a new UMK is entered into the KDC block 70, it is also entered into the UMKH block 105. To generate the sequence of appendixes to the message, the keys for the various levels are in turn encrypted in the block 75, each under the key above it, and finally the serial number of the current UMK is taken from the register 40A (FIG. 2) in block 70. (The store 105 has a finite capacity, so if it becomes full, the older past UMK's are removed from it and stored in the store 15, protected by being encrypted under more recent UMK's).

To recover a stored message, the appendixes are passed one by one to the circuitry of FIG. 4, the first being the UMK serial number which is used to obtain the appropriate UMK from store 105, the next appendix being fed to the circuitry 75 for decryption under the UMK to obtain the LMK, the last appendix being similarly fed to the circuitry 75 for decryption under the LMK to obtain the LDK, and then the message itself being fed to the circuitry 75 for decryption under the LDK and the MK embedded in the message to obtain the body of the message.

Substantially the same technique is used for secure storage of locally generated messages. A safe storage key block SSK 106, similar to the blocks 70, 71, 72, contains a set of key registers for the local key hierarchy PMK, PSMK, and PDK. (Block 106 is shown as smaller than the similar blocks because it contains only keys corresponding to "transmit" keys; there is obviously no need for storage of keys corresponding to "receive" keys). For storing a message, the message is encrypted in the usual way, using a message key MK and the current PDK; it then has the PDK encrypted under the PSMK, the PSMK encrypted under the PMK, the PMK encrypted under the current UMK, and the serial number of the current UMK all appended to it for storage. The message can be recovered by decrypting substantially as for securely stored messages received from other UA's.

The system is also used to provide authentication of locally stored messages, whether received from other UA's or locally generated. The object of such authentication is to preserve locally stored messages from interference by an outsider who may gain access to the PC 14 and memory 15 (FIG. 1), though not of course to the security module 16. Such an outsider might try to delete messages, modify messages, or insert messages.

Figure 6:
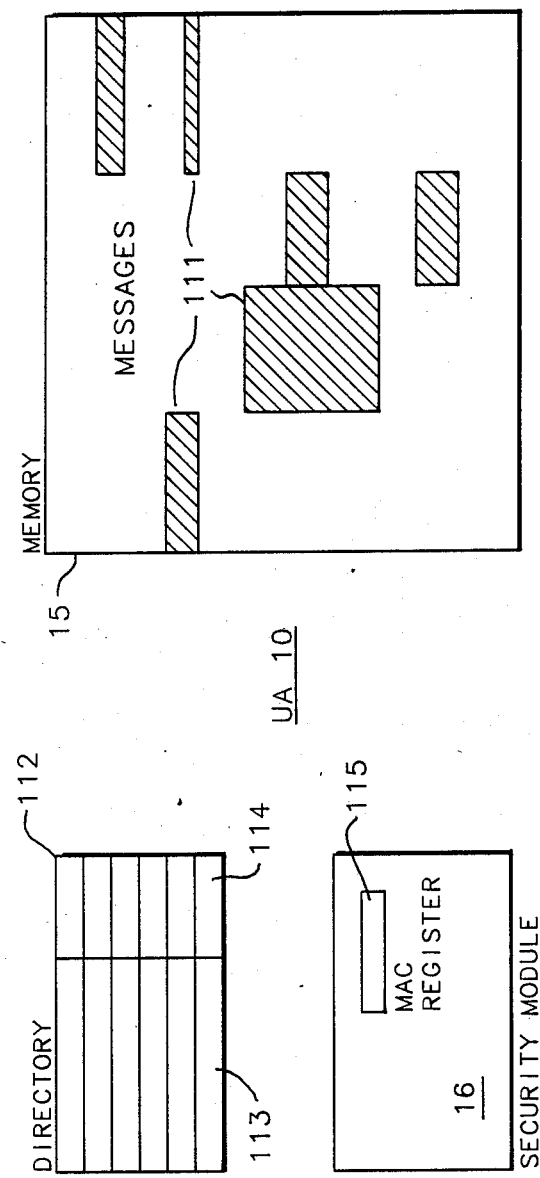
FIG. 6 is a more detailed block diagram of a further part of a UA terminal.

The memory 15 (or the internal memory of the PC 14) contains various messages 111 (FIG. 6) of varying lengths and located in various locations through the memory. (Individual messages may of course be located in sequences of non-consecutive pages in the usual way, without affecting the principles described here). Associated with these messages there is a directory 112, which lists in section 113 an identifying title of each message and the location of the message in memory 15. When the message is entered into the memory 15, a MAC is calculated for it by the MAC generator 42, using the base key under which the message itself is encrypted. This MAC is stored in section 114 of the directory 112 in association with the title and location of the message, stored in section 113. In addition, the whole list of MAC's in the directory 112 is treated as a special message, and a global or super MAC is calculated for these MAC's. This global MAC is stored in a global MAC register 115 located inside the security module 16.

If it is desired to check the integrity of any individual stored file listed in the directory 112, its MAC is calculated and compared with the MAC stored in the directory 112. Since these MAC's are calculated using encrypting keys, if an outsider tries to modify a file, he cannot generate a correct MAC for the modified file. Thus the MAC's in the directory 112 authenticate their individual files. If the integrity of the whole set of files is to be checked, then the global MAC of the MAC's in the directory 112 is calculated, and compared with the stored global MAC in register 115 by the MAC comparator 44 (FIG. 2) in the security module 16. If an outsider changes the directory 112 in any way, eg by deleting an entry, changing the order of entries, or inserting an entry, the global MAC will be changed; and since the global MAC is stored in the security module 16 where an outsider cannot gain access to it, he will be unable to change it, and the global MAC of the altered directory will not match the stored global MAC in register 115. (An outsider would not be able to calculate a global MAC for a changed file, because all MAC's are calculated using keys; but if the global MAC were accessible, he could replace the entire file and global MAC by a previous version).

It will be realized, of course, that the MAC's of the individual files can be stored as part of the stored files. The computation of the global MAC would then involve looking up each stored MAC from its message, by using the directory 112. Also, if the directory 112 is large enough, it can be divided into sections, with a section MAC being computed for each section from the MAC's of the messages identified by that section, and the global MAC being computed from the sectional MAC's. The sectional MC's can be stored in clear; although they can be modified by an outsider, they will either fail to match the MAC's computed from the associated messages of that section or their global MAC will fail to match the stored global MAC in register 115. The directory 112 may of course be located in the memory 15. As an alternative to storing the global MAC in a register in the security module 16, it can be stored outside the security module; but this runs the risk noted above that the whole of the stored information could be replaced by a previous version without being detected. If the user wants to change the stored messages, eg by changing a message, adding a fresh message, or deleting a message, then the MAC of the hanged or added message must be computed and stored in the directory 112, or the MAC of the deleted message deleted from the directory 112, and a new global MAC calculated and stored in the register 115. This involves only the calculation of the new MAC (which is required for internal authentication of the message) and the calculation of the new global MAC from the message MAC's. The MAC's of the unchanged messages are unchanged, and no processing of those messages is required.

Change of UA

It may happen that a user wants to change from his own UA, UA1, to another UA, UA2, either temporarily or permanently. In the first case, he will want to be able to use the new UA temporarily to read messages which have been directed to his normal UA; in the second, he will want to have everything transferred from his old UA to his new one. These two cases are handled differently.

For the first case, the user requests the KDC for a journey key, specifying which other terminal he wants to use. The KDC thereupon issues him with a journey key, and also sets up the UA which he is visiting to respond to the journey key, sending the journey key (encrypted under the UMK and CDK key hierarchy of UA2) to UA2, where it is stored in a journey key register 107 together with the address code of UA1. The user also sets up his own UA to store all received messages and to respond to calls from UA2 by sending them to UA2. This message transfer is achieved by UA1 decrypting the message and re-encrypting it under the journey key (with the usual random MK), and then sending the modified message to UA2. At UA2, the user uses his journey key to decrypt his messages. This technique must be used with caution, as it involves the transmission of the same message encrypted under different keys, and also does not allow for updating of the journey key after a given usage.

For the second case, the UMK of the user must be physically transported to UA2 and installed there. (In fact, all previous UMK's as well may be installed, to allow the transfer of securely stored messages). A link with the KDC is then established, as described above, and links with other UA's are then established. All stored keys already in the UA2 are of course destroyed before the UMK for the new user is installed, and all keys in UA1 are likewise destroyed. All securely stored messages in UA1 are sent to UA2 without any additional encryption, ie in their stored form of encrypted message plus appendixes up to the UMK serial number, so that they can be decrypted at UA2 under the newly installed UMK's.

KDC Message Logging

At a UA, there is no back-up system for the keys, ie for the contents of the security module. This is because it would be a serious weakness to have the keys available outside the security module. A failure at a UA can only be recovered by restarting the UA. The KDC retains a complete set of the UMK's for each UA, and the appropriate set can be sent to the UA over path 13 and reinstalled, so that any securely stored messages can be read. The UA must then re-establish its links with first the KDC and then any other UA's which it wants links with. (As with the original setting up of UA links, much of this can be achieved by a set of stored messages transported over path 13 from the KDC). Any messages which were directed to it during its failed time are irretrievably lost; any users whose messages have been lost have the responsibility of deciding whether they want to resend them once the failed UA has been restored and its links re-established.

The provisions for dealing with failures at the KDC are different. The KDC maintains a record or log of all messages received and sent by it, in the order in which they are acted upon. This log is maintained in the backing store 19. Also, the state of the KDC is periodically stored in the backing store 19. If there is a failure at the KDC, the operator must file back up the KDC to the previously stored state, as recovered from the memory 19. The log of all messages which have occurred since then is then played back to the KDC. This brings the KDC up to its correct current state, with the exception that any keys which it generated and sent out during that time have been lost. Hence during the play-back of the log, any messages which involved the generation and sending out of keys are repeated, so sending out fresh keys to the UA's to replace those which were previously sent out but have become lost by the KDC. The whole system is thus restored to a consistent state.

While the embodiments disclosed herein are preferred, it will be appreciated that they are merely examples, and that various alternatives, modifications, variations or improvements thereon may be made by those skilled in the art from this teaching, which are intended to be encompassed by the following claims:

We claim:

1. A secure messaging system comprising:
   at least three terminals;
   a key distribution center;
   communication means for carrying messages amongst the terminals and between the terminals and the center; and
   means for providing a key means, a key transport key, and a plurality of data transport keys,
   the center being responsive to a message requesting a communication link between first and second ones of the terminals to encrypt the key means according to the key transport key and to send the encrypted key means to both terminals,
   each terminal being operative to decrypt the key means, to encrypt an associated one of the data transport keys according to the key means, to send the encrypted data transport key to the other terminal, to encrypt data according to the data transport keys, and to exchange the encrypted data with the other terminal.

2. A messaging system according to claim 1 wherein the key means comprises two keys, one for use in encrypting a data transport key to be sent from the first terminal to the second and the other for use in encrypting a data transport key to be sent from the second terminal to the first.

3. A messaging system according to claim 1 wherein the means for providing data transport keys is included within the terminals whereby each terminal can generate data transport keys and wherein the data transport key associated with a terminal is generated in that terminal.

4. A messaging system according to claim 3 wherein a terminal comprises:
   means for measuring the usage of its associated data transport key;
   means for changing the key when it has been used a predetermined amount in communication with another terminal; and
   means for causing the changed key to be sent to the other terminal.

5. A messaging system according to claim 1 wherein a key transporting key comprises a heirarchy of keys, a key higher in the heirarchy being used for encrypting a key lower in the heirarchy.

6. A messaging system according to claim 5 wherein a terminal comprises:
   means for measuring the usage of each key transporting key less than the highest in the heirarchy;
   means for changing such key when it has been used a predetermined amount in communication with another terminal; and
   means for encrypting the changed key according to the next highest in the heirarchy; and
   means for causing the changed key to be sent to the other terminal.

7. A messaging system according to claim 1 and further comprising:
   link termination means in a terminal responsive to a request to terminate a communication link between that terminal and a second terminal to delete from the first terminal any keys associated with the link and to send a termination message;
   means in the key distribution center for logging the termination message; and
   means for deleting from the second terminal any keys associated with the link.

8. A messaging system according to claim 7 wherein the means for deleting the keys from the second terminal comprises means in the key distribution center for sending a message to the second terminal instructing that the keys be deleted.

9. A messaging system according to claim 1 and further comprising:
   means in the key distribution center responsive to a request to forward messages from a first terminal to a second terminal to provide a journey key and to send the key to both terminals;
   means in the first terminal for storing the journey key and any received messages; and
   means in the second terminal for storing the journey key,
   the first terminal being responsive to a message call from the second terminal to encrypt any stored messages according to the journey key and to send the encrypted messages to the second terminal.

10. A messaging system according to claim 1 and further comprising:
    means for keeping a log of any messages received and sent by the key distribution center;
    means for storing from time to time backup information indicative of the status of the center; and
    means, operative if there is a failure in the center, to restore the center according to the stored backup information and to cause the center to again generate and transmit any keys which were sent subsequent to the last storage of the backup information.

* * * * *